United States Patent [19]
Cairns et al.

[11] 4,355,895
[45] Oct. 26, 1982

[54] SURVEY SYSTEMS

[75] Inventors: Angus H. Cairns; Nicholas J. Houston, both of Camberley; Noel W. F. Stephens, Yateley, all of England

[73] Assignee: Coal Industry (Patents) Limited, London, England

[21] Appl. No.: 232,761

[22] Filed: Feb. 9, 1981

Related U.S. Application Data

[63] Continuation of Ser. No. 61,101, Jul. 26, 1979, abandoned, which is a continuation of Ser. No. 885,221, Mar. 10, 1978, abandoned.

[51] Int. Cl.³ .................... G01B 11/26; E01B 35/02
[52] U.S. Cl. .................................. 356/141; 33/1 Q; 33/338; 356/152; 356/4
[58] Field of Search ................ 356/1, 4, 141, 152; 33/1 Q, 287, 338

[56] References Cited

U.S. PATENT DOCUMENTS

| | | | |
|---|---|---|---|
| 3,564,257 | 2/1971 | Berry et al. | 244/3.16 |
| 3,751,169 | 8/1973 | Fornerod | 33/1 Q |
| 3,788,748 | 1/1974 | Knight et al. | 356/141 |
| 3,809,477 | 5/1974 | Russell | 356/5 |
| 3,897,151 | 7/1975 | Lecroy | 356/141 |
| 3,950,096 | 4/1976 | Aeschlimann et al. | 356/1 |
| 4,004,852 | 1/1977 | Pentecost | 356/1 |
| 4,025,192 | 5/1977 | Scholdstrom et al. | 356/5 |
| 4,040,738 | 8/1977 | Wagner | 356/1 |
| 4,063,283 | 12/1977 | Rider et al. | 356/1 |
| 4,123,165 | 10/1978 | Brown et al. | 356/152 |

FOREIGN PATENT DOCUMENTS 1513882 6/1978 United Kingdom .................. 356/28

Primary Examiner—S. C. Buczinski
Attorney, Agent, or Firm—James C. Wray

[57] ABSTRACT

A survey system for determining the shape of a fixed path along which there may be no line of sight from end to end. The system comprises a mobile optical detector adapted to travel along the path and a plurality of optical sources which can be arranged along the path. As it moves along, the detector receives optical signals from consecutive groups of the sources and processing circuitry in the system deduces the angular positions of the sources and hence the shape of the path. In a coal mine, the optical sources are positioned on mine roof supports and the detector on a mining machine which traverses to and fro along the coalface. The system then determines the shape of the coalface. The frequency with which the detector and processing circuitry scan the sources is compatible wiht the mining machine. The sources can be retro-reflectors, in which case a primary optical source is mounted adjacent to the detector.

13 Claims, 8 Drawing Figures

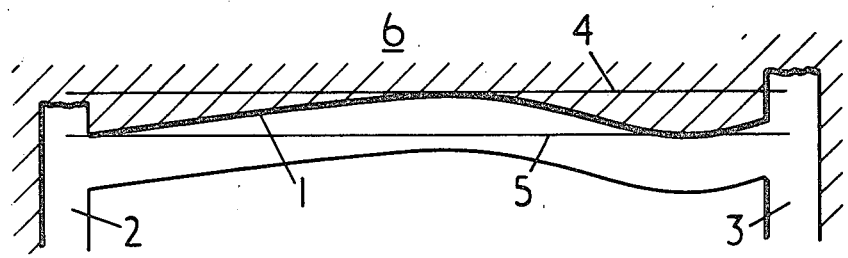
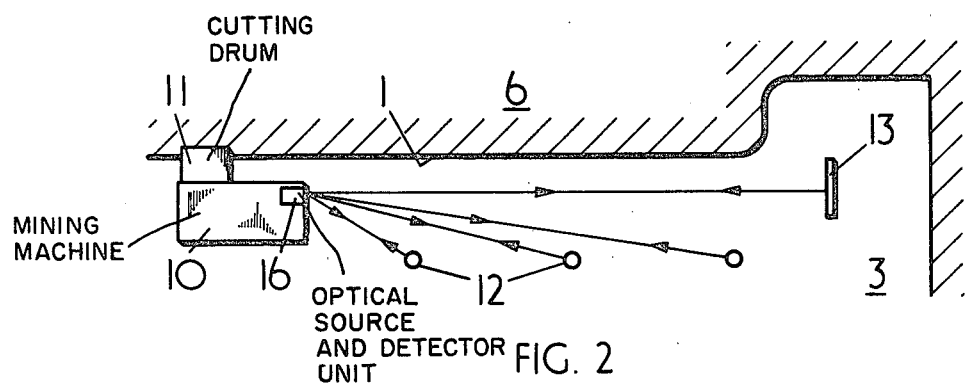

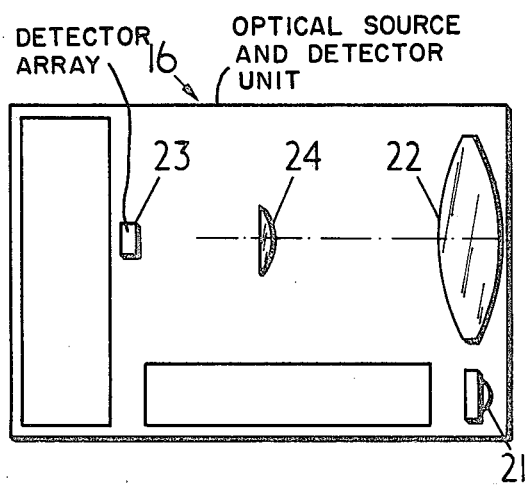
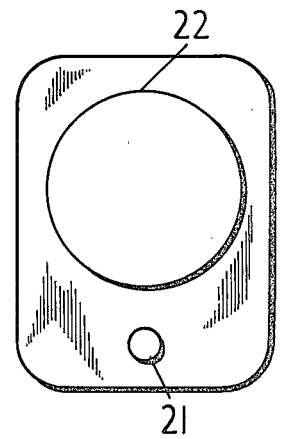
FIG. 4a   FIG. 4b
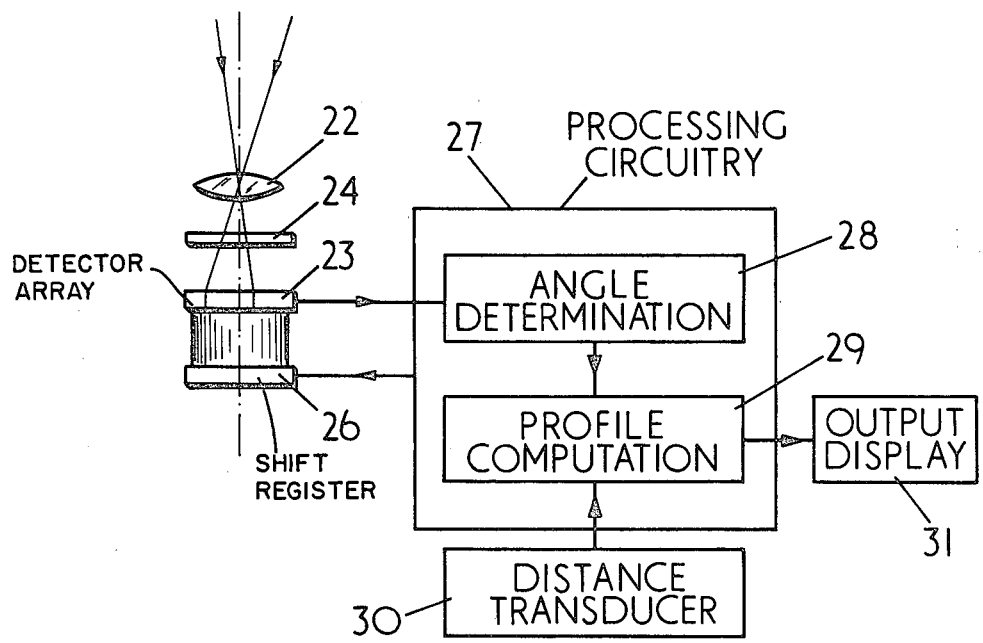
FIG. 5

SURVEY SYSTEMS

This is a continuation of application Ser. No. 61,101, filed July 26, 1979, which is a continuation of U.S. Ser. No. 885,221, filed Mar. 10, 1978, both now abandoned.

BACKGROUND OF THE INVENTION

1. Field of the Invention

The present invention relates to survey systems for determining the shape of a fixed path and particularly for determining such shape when the fixed path defines the profile of an extended surface. The invention is particularly, though not exclusively, suitable for use in an underground mining installation, wherein coal is won from a longwall coalface.

Such an installation includes a coal mining machine adapted to traverse to and fro along an armored face conveyor comprising a plurality of sections or pans extending along the longwall coalface, a plurality of self advancing roof supports arranged along the armored face conveyor on a side away from the coalface and double acting hydraulic rams connecting the roof supports to the conveyor. As coal is won, the coalface equipment is advanced further into the coal seam towards remaining coal, and the mine roof over worked out parts of the coal seam behind the roof supports is allowed to collapse. Advance of the conveyor is effected in a snake-like manner, whereby after passage of the mining machine on a traverse, the sections are pushed up to the newly exposed coalface by the double acting rams. After the sections have been pushed to the coalface the roof supports are one by one lowered, pulled up to the conveyor by the rams, and then reset to the roof.

During normal working of the coal mining installation, it is desirable that the coalface is maintained substantially straight, since face curvature tends to increase stresses upon and wear rate of the mining equipment, thereby causing a greater frequency of breakdown of the mining equipment. Such breakdowns are costly in terms of lost production. Additionally, since the roof which collapses behind the roof support tends to fracture along straight lines, curvature of the face tends to cause falling of the roof in advance of intended points resulting in disruption of normal working and requiring manual shoring up.

It is also desirable that the direction of advance of the coalface further into the seam is consistent (the direction usually being normal to the coalface) since otherwise the conveyor tends to move in its entirety towards one end of the face. Such movement of the conveyor necessitates time consuming transfer of conveyor sections from one end of the face to the other. The movement of the conveyor becomes an even more serious problem in an inclined seam, where gravity tends to enhance such movement. Moreover, in an inclined seam, the coalface is frequently deliberately angled with respect to a line substantially orthogonal to the coal seam in order to reduce the incline and the movement. Maintenance of a particular direction of advance of the coalface also ensures that the total face length i.e. between parallel end tunnels or 'gates' does not vary significantly so that no changes in the number of conveyor sections or roof supports is necessary.

2. Description of the Prior Art

In the kind of mining installation described it has been usual for an operator to advance the conveyor towards the newly exposed coalface in order to attempt to keep the coalface straight and to keep the direction of advance of the coalface substantially constant. However, as it is difficult to determine relative positions of conveyor sections throughout the conveyor length which extends along a coalface of typically two hundred meters, the operator has either to guess when he feels any conveyor section is advanced sufficiently or else advance the section as far as possible towards the coalface. The mine roof supports are then advanced up to the conveyor. Consequently, if lumps of coal or other non uniformities prevent either the conveyor section coming into abutment with the coalface or the full advance of the roof support, then the coalface becomes misaligned on the current or subsequent traverses of the coal winning machine.

It is known for lasers to be used to measure the direction of advance of the coalface and also for lasers to be used to provide a straight line along which rock tunnelling machines can steer.

SUMMARY OF THE INVENTION

According to the principles of the present invention a survey system is provided whereby the profile of the coalface may be determined even where there may be no line of sight from end to end of the coalface. A mobile receiver on the mining machine is provided which receives optical signals from points along the coalface and deduces the coalface profile from the signals together with a signal indicating the machine's position, the deduction being effected with processing circuitry. The detector periodically scans the sources and the processing circuitry solves equations to determine their position.

BRIEF DESCRIPTION OF THE DRAWINGS

FIG. 1 is a diagrammatic plan view of a section through the coalface showing the face profile in an exaggerated form;

FIG. 2 shows a plan view of one end of the coalface with coal cutting machine and survey system in operation;

FIG. 4(a) and (b) are plan and elevation of an optical source/receiver module;

FIG. 5 is a block diagram of the signal processing circuitry of the survey systems.

DESCRIPTION OF THE PREFERRED EMBODIMENTS

Figure 3:
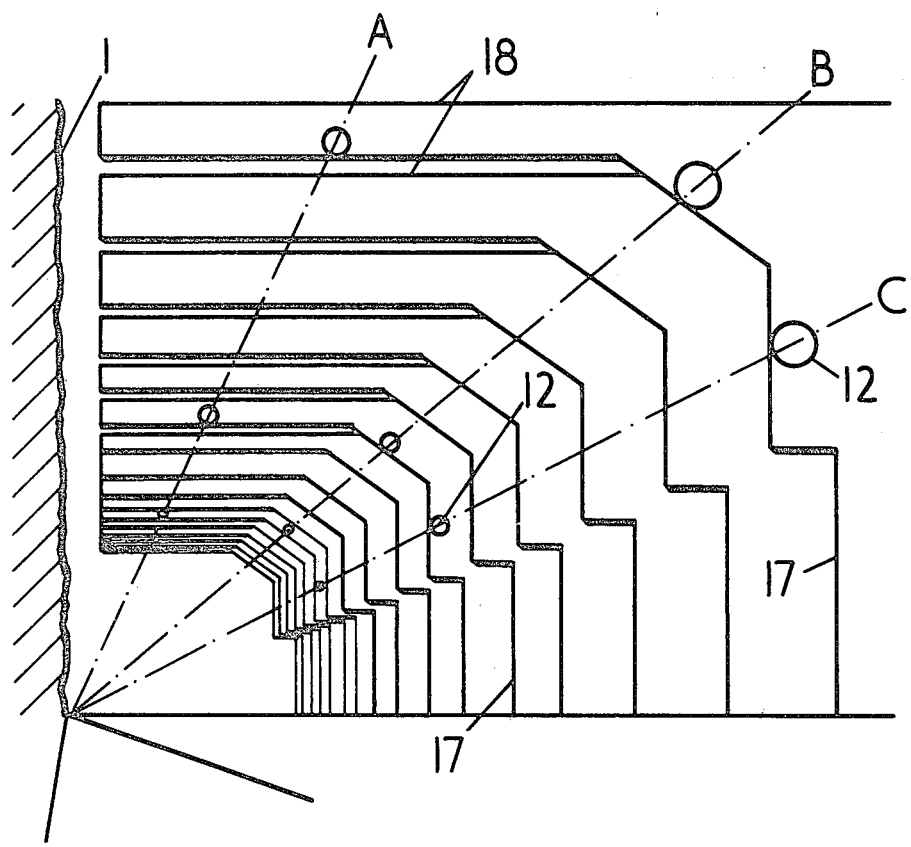
FIG. 3 is a diagrammatic perspective view along the coalface showing the pit props in position.

Referring to FIG. 1 there is shown a coalface 1 extending across a coal seam 6 for, typically, a few hundred meters. The coalface is serviced by mine roadways 2 and 3 known as the main gate and the return gate. It is by means of these roadways that men and equipment can be transported to and from the coalface and won coal transported therefrom.

Where the coal seam is horizontal from side to side the desired direction of advance is parallel to the 'gates' 2 and 3. An ideal profile for the coalface is therefore normal to this direction and parallel to straight lines such as 4 and 5. In general it is satisfactory if the coalface profile lies for the whole of its length between the parallel lines 4, 5 spaced at about one meter apart for a coalface length of, say, three hundred meters.

Reference now to FIG. 2 shows a mining machine 10 which traverses to and fro along the coalface with a cutting drum 11 winning coal during the traverse to a depth into the coalface of about sixty centimeters. The mining machine is electrically powered and runs on rail portions of a conveyor which comprises a plurality of sections movable towards the coalface in a snake-like manner as previously explained. The general line of the conveyor, however, follows the profile of the coalface.

Turning now also to FIG. 3 retro-reflectors 12, some of which are also shown in FIG. 2 can be seen positioned on vertical sections (i.e. legs) of roof supports 17 at fixed intervals, e.g. every fifth support. FIG. 3 also shows alternative positions for the reflectors on horizontal arms or canopies 18 and on other oblique portions of the supports but these can provide difficulties and a loss of accuracy. In any case however, retro-reflectors are placed in identical positions on the selected props. An optical source and detector unit 16, which cooperates with the retro-reflectors is mounted on the machine. The unit 16 is also shown in FIGS. 4a and 4b and is described subsequently.

Spacing of the retro-reflectors is affected by a number of factors. A single set of observation involves simultaneous or substantially simultaneous responses from several reflectors. The greater the range disparity between the nearest and the farthest the more accurate are the results. However, this must be balanced against other factors. The greater the beam path the greater the likelihood of obstruction by variations in the face and by dust etc., in the air. In addition, the greater the range of the optical system the greater has the power of the source to be. Safety requirements put severe restrictions on voltages than can be used so that power requirements of the equipment generally are of major importance.

In the light of the above factors a reflector spacing of five meters is found satisfactory, giving a maximum reflector range of about 20 meters, which does of course imply an optical path length of 40 meters.

The reflectors themselves are of the single-corner cube type of prism form giving internal reflections from externally mirrored surfaces. It will be explained subsequently that the optical source and detector are adjacent but not coincident so that the apex area of the prism, which merely returns a beam directly to the source, is not employed. The prism can therefore be flattened at its apex to reduce its dimensions.

The size of the prism is dictated by the size of the detector window and the spacing between the centers of the source and detector lenses. It may be seen that the reflected patch of light, ignoring blurring, is twice the size of the reflector, irrespective of range. The reflected patch of light has to encompass the detector window between the centers and the periphery of the patch so that the reflector must be of comparable size to the detector window, which, as will be seen, is in effect the objective lens of the receiver optical system.

There are various alternative reflectors which may possibly be used but which are, in general, markedly inferior to the single-corner cube prism reflector. The nearest is perhaps the corner cube array which has an advantage in reduced depth but it still provides a light patch of only twice the size of one corner element (acting, in fact, like a concave mirror with the source near the center of curvature) and produces a net reflected beam much weaker than the single-corner prism. Other alternatives include 'cats-eyes' as used on roads, and light-scattering surfaces of the kind employing a multitude of very small glass beads adhering to a sticky tape.

In addition to the reflector angle information that is derived, a distance transducer (shown in FIGS. 5 and 7) is mounted on the cutting machine to indicate the distance travelled by the receiver. This distance is, of course, measured along the conveyor profile. The distance transducer typically comprises pulse counter odometer means which senses movement of a mechanical component on the machine and derives electrical pulses in proportion to said movement. Such a transducer is described in U.S. patent application Ser. No. 775,120.

Referring again to FIG. 2 in addition to the series of retro-reflectors 12, mounted on the props, a single reflector 13 is positioned at the extreme end of the coalface and directed also towards the receiver mounted on the cutting machine 10. This reflector 13 is on the optical axis of the receiver when the mining machine is correctly positioned both in distance from the coalface and in heading across it. It may be, of course, that the desired heading is not normal to the side gates but is slewed from this direction to counteract the effect of a non-horizontal seam, i.e. to bias the advancing direction of the roof supports slightly up hill. In any event, when the mining machine is correctly located, the angle of the beam reflected from the reflector 13, with respect to the receiver optical axis, is zero. This facility provides a direct indication of the mining machine heading and also facilitates initial set up, but it suffers from the basic disadvantages of a long beam path system in that gross errors may cause interruption of the line of sight and the effects of dust are accentuated.

The reflector 13, is a retro-reflector in the horizontal plane only, consisting of a long triangular section prism the axis of which is vertical. A beam will therefore be returned irrespective of mining machine heading and the height of the reflector will take account of vertical undulations of the mine floor in the vicinity of the coalface.

Referring now to FIGS. 4(a) and (b), there is shown the layout of the source/receiver unit 16 mounted on the mining machine. FIG. 4(b) shows the module as seen from the rear of the mining machine. The optical source 21 is mounted closely beneath the receiver objective lens 22. The source 21 is a gallium-arsenide light-emitting-diode (LED) which can therefore be operated at low voltage and is robust and suited to the environment. The power limitations of this source are overcome to a large extent by pulsing it at a low duty ratio. It is arranged to have a beam spread sufficient to embrace a minimum group of reflectors 12 within a range of twenty meters and may typically provide a 25° horizontal fan beam by means of a lens now shown. The number of reflectors in a group is determined by various factors as will be explained. In an alternative arrangement two source beams are produced, one of fairly wide angle for the near reflectors of the group, and one narrow angle for the more distant ones of the group. The narrow angle then compensates for the long path.

A significant advantage of the LED as a source is that its output is in the near infrared region at about $0.9\mu$. The spectral efficiency of silicon photo-diodes used in the detector at this wavelength is improved substantially as compared with the output of a tungsten lamp (which although of high power has other disadvantages in addition). In addition the detector can use a filter to detect this radiation amongst substantial visible and other 'noise' radiation in the environment. The latter may be caused by deliberate illumination of the coalface, miners' lamps, reflections off odd surfaces etc.

Referring now to FIG. 4(a), a detector array 23 is placed approximately at the focal length of the objective lens 22. A cylindrical lens 24 is positioned, with its axis horizontal, between the lens 22 and the detector array 23, to produce a vertical spread of the field of view and so ensure that any vertical undulations in the positions of the retro-reflectors 12, or elsewhere, do not cause the image to miss the detector array 23. The resulting vertical extent of the image is several times the horizontal extent.

The detector array 23 consists of a line of 256 photodiode elements arranged, in a basic situation, horizontally through the optical axis of the receiver. The image of a retro-reflector 12 projected on to the array will illuminate one or two photo-diode elements at a lateral position corresponding to the angle of the retro-reflector off the optical axis. In the situation described, the reflectors 12 are above the height of the receiver and consequently the image of a line of reflectors is inclined. The array 23 is therefore inclined correspondingly.

Several images of retro-reflectors will be present simultaneously and these will sweep slowly over the array as the coal cutting machine traverses the coalface.

FIG. 5 shows the basic arrangement for identifying the image positions on the array and computing the output values accordingly. The diode array 23 is coupled to a shift register 26. A '1' state is shifted through the register 26 by a clock pulse train, producing an interrogating pulse for each diode element of the array in passing. Output current pulses are thus produced serially from those diodes illuminated. The current pulses are converted to video output pulses for further conversion to digital format in known manner. The data processing is then performed in two stages by processing circuitry 27 comprising firstly a pre-processor 28 which extracts merely the relative angular positions of the nearest group of retro-reflectors and secondly a further microprocessor 29, which performs the remainder of the computation. The further microprocessor 29 also receives a distance signal from the previously mentioned distance transducer which is now shown at 30. A display 31 is connected to the output of the further microprocessor.

The process of computing the face profile has to take account of a number of indeterminate factors. Thus, the reflectors are assumed to be randomly offset from their nominal position. The line of the reflectors is not therefore a true copy of the face profile. The heading of the cutting machine i.e. the direction of the optical axis, is, in general, not known, in view of local variations in the conveyor path. In the worst case, the distance travelled along the 'fixed path' of the conveyor by the cutting machine and the receiver is not known. The principle of the computation is therefore to measure the angular relationship of a group of the reflectors a number of times, ideally a great number of times, throughout the period in which they are visible to the receiver and by correlating the sets of values for the same group of reflectors taken at different positions of the receiver the relative positions of the reflectors of this group can be determined in terms of x and y co-ordinates of a predetermined reference. Each set of angle values for a group in effect provides an equation, relating the positions of the reflectors of that group to each other and to the receiver position at the instant of taking the angle values. A sufficient number of sets of values will therefore enable the equations to be solved for x and y. A surplus of such sets of values can be assessed on a statistical basis to provide the best values for x and y. As the receiver travels along the face one reflector will pass from view and another will come into view. Each reflector will therefore feature in a number of successive groups and multiple angle determinations will be made in respect of each group that a reflector features in. The statistical data are thus increased accordingly. The mathematical processes involved in the extraction of x and y in a situation of this kind are well known and employ the Kalman filtering process. This operates by iterative adjustment of a mathematical model of the reflector dispositions to minimise the difference between the observed angular position of a reflector as presented by the microprocessor and an estimated value of that angular position, with respect to the variables: y displacement of detector array from x axis; x position of each particular reflector; y position of each particular reflector; distance in x moved by the detector array; and the skew angle of the receiver optical axis to the x axis.

On a first run the mathematical model relies on data fed in: nominal interval between reflectors; number of reflectors; mean distance between receiver and line of reflectors etc. However, after the first run, each estimated profile and reflector disposition can be used for the next run, since each profile will be fairly closely related to the next.

During a run, for each set of observations, or 'scan', the estimated values of the reflector angle off the optical axis are calculated for each reflector, using the previously estimated reflector positions and the assumed new position of the mining machine and receiver. The differences between these estimated values and the currently observed angles are used to adjust the estimated machine position and the reflector positions so as to minimize the mean square error between estimated and measured angles over all scans.

A convenient reference line at least for the first run is taken to be the line through the first two reflectors, this then being the x axis referred to above.

There is a minimum number of reflectors that can feature in a group, i.e. of simultaneous angle determinations, for the extraction of the co-ordinates of the reflectors and the receiver to be possible. If there are absolutely no other references than the angular displacements of the reflectors in a group, then four reflectors is a minimum group. If, however, a further reference is supplied, in the form of the distance travelled by the receiver, for example, or the range of each reflector, then the minimum number can be reduced. The greater the number in a group however, the greater the amount of statistical information available and the more accurate the results.

Since the positions of the reflectors transverse to the coal face cannot be relied upon, for reasons explained above, the final layout of these reflectors is of secondary importance compared to the path of the receiver, which, as mentioned, moves in and out transversely in synchronism with the coalface. The reflectors therefore provide a set of temporary reference points for the location of this fixed path, the lack of prior knowledge of the positions of these reference points being compensated by the multiplicity of angle determinations taken.

The micro processor determining the observed reflector angles is mounted on the cutting machine. The main processor, which analyses the observations and calculates the estimated dispositions, is mounted, together with the display 31 in the gate.

The output is then displayed at the machine in the following form (a) A small number (e.g.4) indicator lamps indicating such things as: computer running; self-check O.K.; input data validity; power supply levels correct.

(b) A digital (LED) display showing, on demand, any of the data words normally output on the data link. Thus for example, with the machine stationary, the angles of the nearest retro-reflectors can be displayed in turn and checked against measurements taken by surveying methods.

(c) An analog display of face profile. This is of most interest to the miners working at the face. A row of (parallel) linear LED displays gives a long rectangular dot matrix on which the current or previous profile is graphically displayed.

The term "optical" as used in this specification applies to any visible or invisible radiation having optical properties and thus includes, for example, infra-red and ultra-violet light.

Various modifications of the system are possible. Thus the reflectors fitted to the roof supports may be replaced by lamps or other sources so obviating the primary source on the receiver module. The reflector arrangement does however have the advantage that the active devices are all kept in one place rather than distributed along the coalface with the attendant disadvantages of supply cables.

Figure 6:
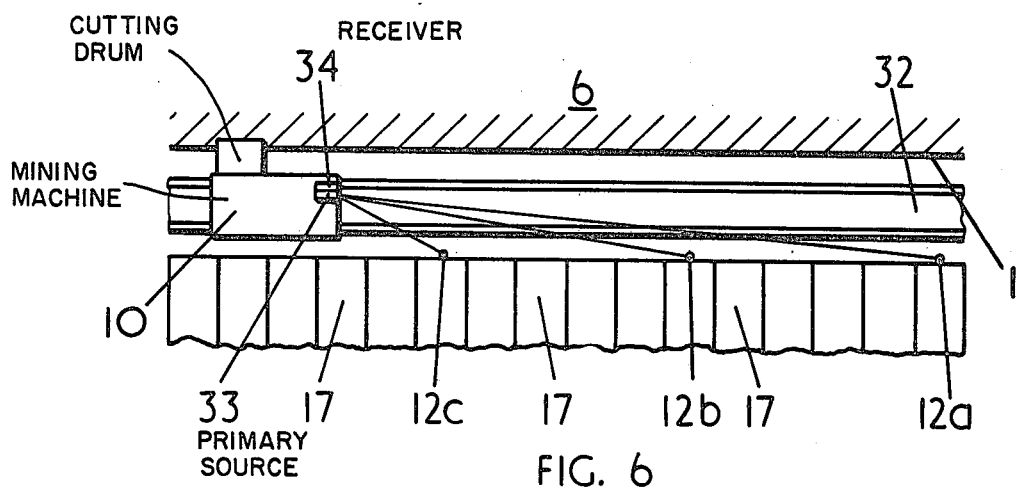
FIG. 6 shows a plan view of part of a coalface installation including a second embodiment of survey system.
Figure 7:
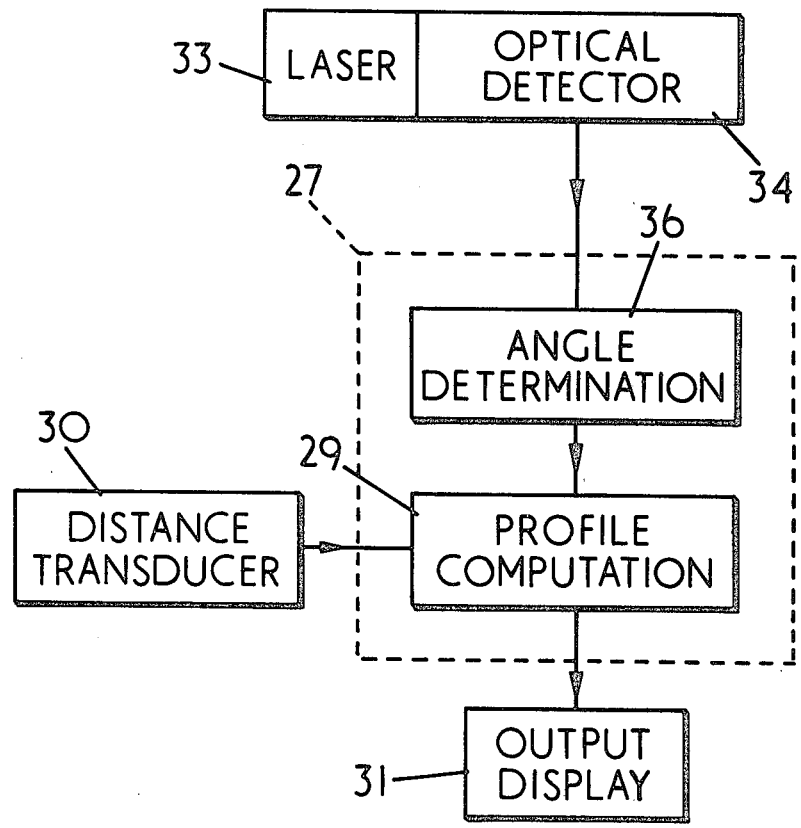
FIG. 7 shows a block diagram of a signal source, detector and processing circuitry of the embodiment of FIG. 6.

In FIGS. 6 and 7 which should now be referred to the same reference numerals are used where appropriate. The previously mentioned armoured face conveyor is now shown at 32 in FIG. 6. A primary source 33 emits a laser beam of fan shape extended in the vertical direction and swept horizontally, broadside as it were, so as to intercept the reflectors sequentially. In FIG. 6 for example, the laser beam intercepts retro-reflector 12a, then 12b and then 12c. The vertical extension ensures that undulations from the horizontal do not prevent the reflectors from seeing the laser beam. A receiver shown at 34 is a localized wide angle optical detector, instead of array as described in the previous embodiment, the angular displacement of each reflector from the last being indicated by the time interval between reception of the reflected beams. The processing circuitry 27 is then adapted to measure these time intervals by utilization of a modified pre-processor 36.

Instead of a linear array of optical detectors, a rectangular array may be used to give an equivalent vertical spread to the field of view in the absence of the cylindrical lens.

Charge coupled devices can also be used as combined optical detectors and analog shift registers in place of the standard optical elements proposed.

The profile display may be provided by an electroluminescent panel or liquid crystal panel.

In an alternative mounting arrangement for the reflectors they could be positioned on a spill plate portion of the conveyor, so that, being fixed with respect to the conveyor they define the face profile exactly. Although this would simplify the calculations by the removal of a variable, it would mean that the reflectors were low down and vulnerable to damage of displacement.

It will be clear that, although the system described is particularly suited to a mining operation, the invention is also applicable to the survey of any extended surface or path to which a mobile receiver can be constrained, whether above or below ground.

We claim:

1. A survey system comprising a mobile optical receiver adapted to travel a fixed path, a series of optical sources positioned in a line generally along said path, the receiver having sensor array means for substantially simultaneously receiving light from a predetermined minimum group of sources within the series of sources, the sensor array means being responsive to light projected by the group of optical sources visible to the receiver to determine the angle of incidence of the light projected from each visible source of the group relative to an optical axis of the receiver, the system having means for periodically electronically scanning the sensor array means to detect light impinging upon the sensor array means for effecting such source angle determinations periodically, the period of said scanning means being such that a plurality of angle determinations are made on each group of sources visible to the receiver, the system further including processing circuitry adapted to correlate the angular measurements and to derive therefrom information identifying the shape of said fixed path.

2. A survey system according to claim 1, including means providing an indication of distance travelled by said mobile receiver along said fixed path, this distance indication being supplied to said processing circuitry as a factor in the determination of said fixed path.

3. A survey system according to claim 1, wherein said sources are reflectors and a primary source is mounted adjacent the receiver.

4. A survey system according to claim 2, wherein said sources are reflectors and a primary source is mounted adjacent the receiver.

5. A survey system according to claim 3, wherein said reflectors are retro-reflectors.

6. A survey system according to claim 5 wherein said primary source has a beam width sufficient to illuminate said minimum group of sources.

7. A system according to claim 1, wherein said sensor array means comprises an array of photo-electric elements which are activated selectively according to the angle of an incident beam of light relative to an optical axis of the receiver.

8. A system according to claim 7 wherein said array is a linear array responsive to the position of said sources in a plane containing said array.

9. A system according to claim 8 wherein said linear array consists of photo-diodes which are coupled to a shift register to permit serial interrogation and serial read-out of beam-incidence information, the relative spacing of stored charge in said array of photo-diodes providing an output dependent upon the angles of incidence of respective beams.

10. A survey system comprising a mobile optical receiver adapted to travel a fixed path, a series of optical sources positioned in a line generally along said path, the receiver being responsive to light projected by optical sources visible to the receiver to determine the angle of incidence of the light projected from the source relative to an optical axis of the receiver, the system further including processing circuitry adapted to correlate the angular measurements and to derive therefrom information identifying the shape of said fixed path, wherein said sources are retro-reflectors and a primary source is mounted adjacent the receiver, and wherein said primary source has a beam of substantially line section, the primary source being adapted to make a broad side sweep so as to scan a predetermined minimum group of said reflectors, the receiver including circuit means for processing signals resulting from sequential reception of plural beams.

11. A system according to claim 10 wherein said primary source is a laser and the receiver comprises a localized photo-electric element having a wide angle of view, said circuit means being responsive to the time lapse between successive beam receptions to provide an output dependent upon the angles of incidence of the respective beams.

12. A survey system according to claim 1, for use in determining the profile of a coalface, said mobile receiver being mounted on a coal winning machine so that the coalface is parallel to said fixed path, said sources being mounted in similar positions on mine roof supports.

13. A system according to claim 12, wherein a reflector is mounted on an optical axis of the receiver at one end of the coalface to provide a direct reading of the heading of the coal winning machine throughout the travel of the receiver.

* * * * *